(12) United States Patent
Cheng et al.

(10) Patent No.: US 11,579,309 B2
(45) Date of Patent: Feb. 14, 2023

(54) GLOBAL NAVIGATION SATELLITE SYSTEM (GNSS) MULTIPATH MITIGATION

(71) Applicant: u-blox AG, Thalwil (CH)

(72) Inventors: Zhenlan Cheng, Thalwil (CH); Kaspar Giger, Thalwil (CH); Roderick C. Bryant, Thalwil (CH)

(73) Assignee: u-blox AG, Thalwil (CH)

( * ) Notice: Subject to any disclaimer, the term of this patent is extended or adjusted under 35 U.S.C. 154(b) by 72 days.

(21) Appl. No.: 17/056,732

(22) PCT Filed: May 18, 2018

(86) PCT No.: PCT/EP2018/063215
§ 371 (c)(1),
(2) Date: Nov. 18, 2020

(87) PCT Pub. No.: WO2019/219218
PCT Pub. Date: Nov. 21, 2019

(65) Prior Publication Data
US 2021/0199812 A1 Jul. 1, 2021

(51) Int. Cl.
*G01S 19/22* (2010.01)
*G01S 19/24* (2010.01)
(Continued)

(52) U.S. Cl.
CPC ............ *G01S 19/22* (2013.01); *G01S 19/243* (2013.01); *G01S 19/254* (2013.01); *G01S 19/21* (2013.01); *G01S 19/246* (2013.01); *G01S 19/37* (2013.01)

(58) Field of Classification Search
CPC ........ G01S 19/246; G01S 19/21; G01S 19/22; G01S 19/243; G01S 19/254; G01S 19/37
(Continued)

(56) References Cited

U.S. PATENT DOCUMENTS 5,808,582 A * 9/1998 Woo .................. G01S 19/22
375/150
6,047,017 A * 4/2000 Cahn .................. G01C 21/26
375/150
(Continued)

FOREIGN PATENT DOCUMENTS

WO WO 2018/014980 A1 1/2018

OTHER PUBLICATIONS

Huang et al., "An Implementation to Mitigate the Effect of Multipath on Positioning Accuracy," 2010 6$^{th}$ International Conference on Wireless Communications Networking and Mobile Computing (WICOM), Sep. 23, 2010 (4 pgs.).

*Primary Examiner* — Chuong P Nguyen
(74) *Attorney, Agent, or Firm* — Finnegan, Henderson, Farabow, Garrett & Dunner, L.L.P.

(57) ABSTRACT

A tracking loop and associated method for tracking a satellite signal in a GNSS receiver and for determining a line-of-sight (LOS) signal from a plurality of satellite signals received by the GNSS receiver from a satellite. One or more first correlators perform a correlation between a code signal derived from one of the received satellite signals and a plurality of corresponding replica code signals to determine a plurality of code correlation sums comprising a prompt code correlation sum, one or more early code correlation sums and one or more late code correlation sums. One or more second correlators correlate the plurality of code correlation sums with a plurality of replica carrier signals, each having a different Doppler frequency offset, to determine, for each of the plurality of code correlation sums, a set of correlation magnitudes at frequencies of the plurality of replica carrier signals. An LOS identification module identifies the LOS signal based on a signal propagation delay corresponding to one or more local maxima within the sets of correlation magnitudes.

20 Claims, 5 Drawing Sheets

(51) Int. Cl.
*G01S 19/25* (2010.01)
*G01S 19/21* (2010.01)
*G01S 19/37* (2010.01)

(58) Field of Classification Search
USPC .... 342/352, 357.59, 357.61, 357.63, 357.64, 342/357.77
See application file for complete search history.

(56) References Cited

U.S. PATENT DOCUMENTS

| | | | | |
|---|---|---|---|---|
| 6,198,765 | B1* | 3/2001 | Cahn | G01C 22/00 |
| | | | | 370/335 |
| 8,358,244 | B2* | 1/2013 | Shirai | G01S 19/22 |
| | | | | 342/357.61 |
| 8,625,657 | B2* | 1/2014 | Qin | H04B 1/7075 |
| | | | | 375/150 |
| 8,775,076 | B2* | 7/2014 | Shirai | G01S 19/22 |
| | | | | 701/478.5 |
| 9,581,700 | B2* | 2/2017 | Hyun | G01S 19/30 |
| 10,725,183 | B2* | 7/2020 | Lennen | G01S 19/22 |
| 11,187,810 | B2* | 11/2021 | Cheng | G01S 19/235 |
| 2007/0253471 | A1* | 11/2007 | Wilhelmsson | H04B 1/7075 |
| | | | | 375/150 |
| 2008/0205493 | A1* | 8/2008 | Kohli | G01S 19/30 |
| | | | | 375/150 |
| 2009/0168851 | A1 | 7/2009 | Wang et al. | |
| 2009/0213912 | A1* | 8/2009 | Brenner | G01S 19/30 |
| | | | | 375/150 |
| 2018/0074207 | A1 | 3/2018 | Marmet et al. | |
| 2021/0286088 | A1* | 9/2021 | Cheng | G01S 19/29 |

* cited by examiner

GLOBAL NAVIGATION SATELLITE SYSTEM (GNSS) MULTIPATH MITIGATION

CLAIM FOR PRIORITY

This application is a U.S. national phase entry under 35 U.S.C, § 371 from PCT International Application No, PCT/EP2018/063215, filed May 18, 2018, from which this application claims priority and is incorporated herein by reference.

TECHNICAL FIELD

The invention relates to methods and apparatus for mitigation of multipath effects when tracking a satellite signal received by a Global Navigation Satellite System (GNSS) receiver. In particular, the invention may relate to methods and apparatus for use in a GNSS receiver for identifying a line-of-sight (LOS) signal from among a plurality of signals including at least one indirect (or multipath) signal.

BACKGROUND

Typical GNSS receivers are configured to receive signals from a plurality of GNSS satellites to determine a navigation solution for the GNSS receiver. The navigation solution is typically an 8-state vector including: 3-dimensional position; 3-dimensional velocity; receiver timing offset; and receiver timing drift.

In order to provide the navigation solution, a GNSS receiver must track satellite signals transmitted by GNSS satellites orbiting the earth acquired by the receiver during acquisition. In some environments it is challenging for a GNSS receiver to track the satellite signals due to multipath, which refers to the phenomenon that the receiver can receive several signals coming from the same GNSS satellite which have propagated along different paths. The reception at the GNSS receiver of reflected satellite signals, possibly in addition to the direct or line-of-sight (LOS) signal, is one of the most detrimental error sources in GNSS positioning. The related phenomena of diffraction and scattering can also generate multipath signals. A GNSS receiver may receive the direct satellite signal (the LOS signal) as well as one or more indirect (or multipath) signals that have been reflected, diffracted and/or scattered en route to the GNSS receiver, for example by buildings or other objects in the vicinity of the GNSS receiver. The term "indirect" is used herein to encompass a path of a signal from a satellite to a GNSS receiver that is not the LOS signal but that includes at least one reflection, scattering and/or diffraction effect.

The multipath signals follow a longer path than that of the LOS signal because they are reflected from objects en route to the GNSS receiver and arrive at the GNSS receiver later than the LOS signal. Where the delay of the multipath signals is significant they can be identified by the receiver fairly easily but that is not the case when the delay of the multipath signals is relatively small. Typically, the most significant effect of such multipath is on pseudorandom noise (PRN) code and carrier tracking accuracy because code and carrier tracking loops within a GNSS receiver deliver code delay and Doppler frequency measurements to the navigation engine that relies on LOS measurements while the acquisition and data demodulation can be optimized to maximize the received total signal power independent of LOS or multi-paths.

Code tracking in a GNSS receiver is accomplished with the use of a delay lock loop (DLL). A DLL tracks and estimates the phase misalignment between an incoming code of a received GNSS satellite signal and a locally generated code replica of the satellite signal. A DLL typically comprises at least two code correlators that correlate a carrier removed signal derived from a received satellite signal with locally generated replica codes produced by at least one code generator. The code generator is controlled by a numerically controlled oscillator (NCO) which keeps track of the code phase of the incoming satellite signal. The outputs of the code correlators are integrated over time to average or smooth the effect of noise and the resulting signal is used in an algorithm to control the NCO to update the code phase of the locally generated replica code such that the code delay between the received satellite signal and the locally generated replica code is minimized. In exemplary DLLs, there may be more than two code correlators, each producing one of early, prompt and late code correlations. In conventional GNSS receivers there is a separate DLL for each channel and the DLLs operate independently of each other.

Carrier tracking may be accomplished using a frequency lock loop (FLL), a phase lock loop (PLL) or a combination of both, e.g. an FLL-assisted PLL. An FLL follows a similar signal processing procedure as a DLL except that the Doppler frequency of the incoming satellite signal is tracked and the FLL estimates the current frequency error. In one implementation, a mixer multiplies a received satellite signal (possibly at an intermediate frequency) with a corresponding locally generated carrier signal provided by a carrier generator. The carrier generator is controlled by an NCO. It is noted here that the locally generated carrier signal may be at a frequency corresponding to an intermediate frequency (IF) of the receiver, rather than the actual carrier frequency transmitted by the satellites. That is, the locally generated carrier signal need not be at the frequency transmitted by the satellites and may be at a lower frequency suitable for generating an IF or baseband signal. The output of the mixer, which may be termed a carrier removed signal, is integrated over time to average or smooth the noise and the resulting signal is used in an algorithm to control the carrier NCO to update the locally generated carrier signal such that its frequency is as close as possible to the carrier frequency (or IF) of the incoming GNSS signal. In traditional GNSS receiver architectures there is usually a separate carrier tracking loop for each channel inside the receiver.

In cases where multipath signals arrive at the GNSS receiver soon after the LOS signal, the received signal can be considered as a composite signal comprising the LOS signal and the multipath signal(s). In such cases, the code and carrier phase and spectral characteristics of that composite signal can become less clear and therefore more difficult for the GNSS receiver to determine. This can result in a distortion of the correlation function between the received composite signal and the replica code and/or carrier signal generated in the GNSS receiver, which in turn can lead to errors in the code and carrier tracking loops.

It is desirable to improve the performance of code and carrier tracking loops in multipath environments and in particular for mobile GNSS receivers.

SUMMARY

According to the invention in an aspect, there is provided a tracking loop for tracking a satellite signal in a Global Navigation Satellite System (GNSS) receiver and for identifying a line-of-sight (LOS) signal, for use in the tracking loop, from a plurality of satellite signals received by the GNSS receiver from a satellite, the satellite signals comprising an LOS signal and one or more indirect signals, the apparatus comprising: one or more first correlators configured to undertake a correlation between a code signal derived from at least one of the received satellite signals and a plurality of corresponding replica code signals to determine a plurality of code correlation sums comprising a prompt code correlation sum, one or more early code correlation sums and one or more late code correlation sums, wherein each replica code signal is indicative of a different satellite signal propagation delay; one or more second correlators configured to correlate the plurality of code correlation sums with a plurality of replica carrier signals, each having a different Doppler frequency offset, to determine, for each of the plurality of code correlation sums, a set of correlation magnitudes at frequencies of the plurality of replica carrier signals; and an LOS identification module configured to identify the LOS signal amongst the plurality of satellite signals relating to the satellite based on a signal propagation delay corresponding to one or more local maxima within the sets of correlation magnitudes.

Optionally, the LOS identification module is configured to identify a local maximum to be a largest correlation magnitude of the set of correlation magnitudes relating to a particular replica code signal and having a signal-to-noise ratio greater than a threshold value.

In some arrangements, the LOS identification module is configured to identify the LOS signal to be the satellite signal corresponding to a local maximum relating to a lowest signal propagation delay.

In certain tracking loops the sets of correlation magnitudes together define a frequency-time-domain correlation area, the tracking loop further comprising a Central Parameter Generator (CPG) configured to determine an a-priori LOS carrier frequency and an a-priori LOS code phase together with a variance thereof based on position, velocity and/or time data previously determined by the GNSS receiver, and wherein the LOS identification module is configured to identify a frequency-time-domain search area that is a subarea of the frequency-time-domain correlation area based on the variances of the a-priori LOS carrier frequency and a-priori LOS code phase, and to determine the LOS signal based on the sets of correlation magnitudes in the search area.

Optionally, if a first local maximum is inside the search area and a second local maximum is outside the search area, the LOS identification module is configured to identify the LOS signal to be the signal corresponding to the second local maximum if it has a signal propagation delay lower than the first local maximum and has a magnitude greater than the first local maximum by at least a threshold value. It is noted that in some exemplary arrangements, the threshold value may be zero and in other arrangements it may have a non-zero value.

If the one or more local maxima are inside the search area, the LOS identification module may be configured to determine the LOS signal to be the satellite signal corresponding to a local maximum relating to a lowest signal propagation delay.

If the one or more local maxima are outside the search area, the LOS identification module may be configured to determine the LOS signal to be the satellite signal corresponding to a local maximum relating to a lowest signal propagation delay.

In some arrangements, the one or more first correlators form part of a baseband processing unit of the GNSS receiver.

The plurality of code correlation sums comprise modulation data and the tracking loop may further comprise one or more multipliers configured to remove the modulation data from the code correlation sums. The tracking loop may further comprise an integration unit configured to integrate the code correlation sums having the modulation data removed to generate further code correlation sums.

Optionally, the one or more second correlators comprise a discrete Fourier transform (DFT) engine configured to determine the set of correlation magnitudes by undertaking a DFT of each of the code correlation sums.

In certain arrangements, a central frequency bin of a DFT undertaken by the DFT engine is a replica carrier frequency corresponding to a previous tracking epoch of the GNSS receiver.

According to the invention in an aspect there is provided a GNSS receiver comprising a plurality of channels, each channel comprising a tracking loop according to any tracking loop disclosed herein.

According to the invention in an aspect there is provided a method for tracking a satellite signal in a Global Navigation Satellite System (GNSS) receiver and for identifying a line-of-sight (LOS) signal, for use in the tracking loop, from a plurality of satellite signals received by the GNSS receiver from a satellite, the satellite signals comprising an LOS signal and one or more indirect signals, the method comprising: undertaking, by one or more first correlators, a first correlation between a code signal derived from at least one of the received satellite signals and a plurality of corresponding replica code signals to determine a plurality of code correlation sums comprising a prompt code correlation sum, one or more early code correlation sums and one or more late code correlation sums, wherein each replica code signal is indicative of a different satellite signal propagation delay; performing, by one or more second correlators, a second correlation between the plurality of code correlation sums and a plurality of replica carrier signals, each having a different Doppler frequency offset, to determine, for each of the plurality of code correlation sums, a set of correlation magnitudes at frequencies of the plurality of replica carrier signals; and identifying, by an LOS identification module, the LOS signal amongst the plurality of satellite signals relating to the satellite based on a signal propagation delay corresponding to one or more local maxima within the sets of correlation magnitudes.

The method may further comprise the LOS identification module identifying a local maximum to be a largest correlation magnitude of the set of correlation magnitudes relating to a particular replica code signal. A local maximum may have a signal-to-noise ratio greater than a threshold value. It is noted that in some exemplary arrangements, the threshold value may be zero and in other arrangements it may have a non-zero value.

Optionally, the LOS identification module is configured to identify the LOS signal to be the satellite signal corresponding to a local maximum relating to a lowest signal propagation delay.

The sets of correlation magnitudes together define a frequency-time-domain correlation area. Certain methods may further comprise: determining, by a Central Parameter Generator (CPG), an a-priori LOS carrier frequency and an a-priori LOS code phase together with a variance thereof based on position, velocity and/or time data previously determined by the GNSS receiver; determining, by the LOS identification module, a frequency-time-domain search area that is a subarea of the frequency-time-domain correlation area based on the variances of the a-priori LOS carrier frequency and a-priori LOS code phase; and identifying, by the LOS identification module, the LOS signal based on the sets of correlation magnitudes in the search area.

Optionally, the method further comprises, if a first local maximum is inside the search area and a second local maximum is outside the search area, identifying, by the LOS identification module, the LOS signal to be the satellite signal corresponding to the second local maximum if it has a signal propagation delay lower than the first local maximum and has a magnitude greater than the first local maximum by at least a threshold value. It is noted that in some exemplary arrangements, the threshold value may be zero and in other arrangements it may have a non-zero value.

The plurality of code correlation sums comprise modulation data and the method may further comprise removing, by one or more multipliers, the modulation data from the code correlation sums.

The second correlation may be performed by a discrete Fourier transform (DFT) engine and the method may further comprise determining the set of correlation magnitudes by undertaking a DFT of each of the code correlation sums.

According to an aspect of the invention, there is provided a method for tracking a satellite signal in a Global Navigation Satellite System, GNSS, receiver and for identifying a line-of-sight, LOS, signal, for use in a tracking loop, from a plurality of satellite signals received by the GNSS receiver from a satellite, the satellite signals comprising an LOS signal and one or more indirect signals, the method comprising: receiving a plurality of code correlation sums that have been determined by one or more first correlators undertaking a first correlation between a code signal derived from at least one of the received satellite signals and a plurality of corresponding replica code signals, the plurality of code correlation sums being received by one or more second correlators and comprising a prompt code correlation sum, one or more early code correlation sums and one or more late code correlation sums, wherein each replica code signal is indicative of a different satellite signal propagation delay; performing, by the one or more second correlators, a second correlation between the plurality of code correlation sums and a plurality of replica carrier signals, each having a different Doppler frequency offset, to determine, for each of the plurality of code correlation sums, a set of correlation magnitudes at frequencies of the plurality of replica carrier signals; and identifying, by an LOS identification module, the LOS signal amongst the plurality of satellite signals relating to the satellite based on a signal propagation delay corresponding to one or more local maxima within the sets of correlation magnitudes.

According to an aspect of the invention, there is provided a computer program comprising instructions which, when executed on at least one processor, cause the at least one processor to carry out the method according to any disclosed herein.

BRIEF DESCRIPTION OF THE DRAWINGS

Exemplary embodiments of the invention are described herein with reference to the accompanying drawings, in which.

DESCRIPTION

Generally, disclosed herein are methods and apparatus for mitigation of multipath effects in code and/or carrier tracking loops of a GNSS receiver. Exemplary methods and apparatus make use of a spread of Doppler frequencies (Doppler spread) relating to a plurality of satellite signals (i.e. LOS plus multipath) received at a GNSS receiver from a satellite. The Doppler spread is caused at least in part by movement of the GNSS receiver in combination with the fact that multipath signals arrive at the GNSS receiver from different directions when compared to the LOS signal.

In one exemplary arrangement, frequency-time-domain correlation is undertaken as part of satellite signal tracking, providing a frequency-time correlation area in which there are one or more local maxima (defined below). The LOS signal is identified to be the satellite signal corresponding to one of the local maxima within the correlation area, which may also be termed a correlation space, based on the signal propagation delay relating to that local maximum. Carrier and code tracking loops may be driven using the code phase and Doppler of the identified LOS signal.

A purpose of the invention is to provide a navigation engine of a mobile GNSS receiver with code phase and Doppler frequency measurements of satellite signals originating from line-of-sight (LOS) propagation paths, which are largely free of multipath interference due to long coherent integration. The Doppler frequency and code phase of LOS satellite signals also drive a carrier tracking loop and a code tracking loop, respectively to facilitate the tracking of LOS satellite signals by the GNSS receiver.

Figure 1:
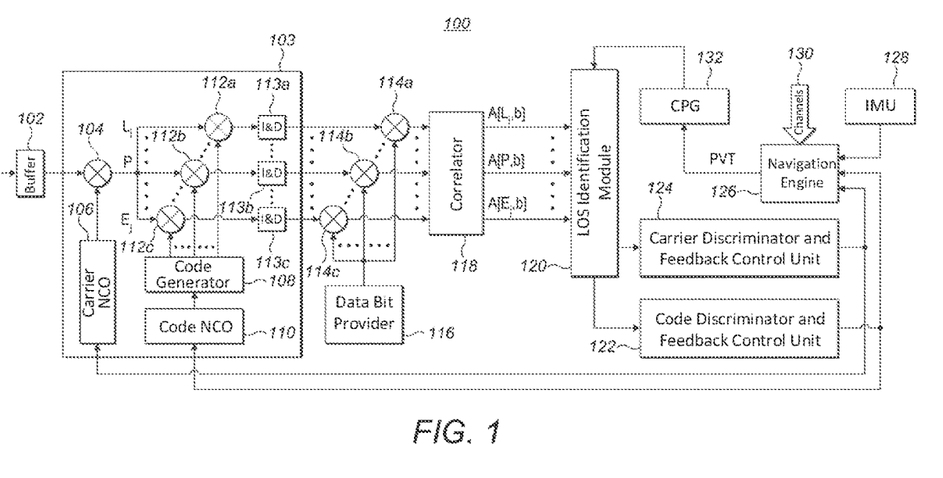
FIG. 1 shows a block schematic diagram of an apparatus for tracking a satellite signal.

FIG. 1 shows an exemplary apparatus for tracking satellite signals. The apparatus 100 comprises a channel of a GNSS receiver. The following is a general description of the arrangement of the apparatus in FIG. 1.

A GNSS receiver comprises a plurality of channels. However, for the sake of clarity only a generic channel comprising the apparatus 100 is described below. One or more further channels can be considered to comprise at least some of the same features as the channel described herein.

A digitised intermediate frequency (IF) signal is received by the channel of the apparatus 100. The digitised IF signal is derived by a radio frequency (RF) front-end of a GNSS receiver followed by a digital pre-processing unit, both of which are not shown in FIG. 1. Typically, GNSS satellite RF signals are received by a GNSS receiver antenna and are amplified by a low-noise preamplifier. The amplified signals are then down-converted from RF to an IF by mixing them with a local oscillator signal. The down-conversion may be undertaken in a number of steps with a different local oscillator in each step. The satellite signal is therefore lowered from the RF carrier frequency, which may differ with GNSS constellation and/or the satellite transmitting, to an IF that can be processed by the at least one channel of the receiver. The carrier Doppler and pseudorandom noise (PRN) codes are preserved in the IF signal. The exemplary methods and apparatus disclosed herein comprise digital signal processing apparatus and the IF signal is therefore digitised in an analogue-to-digital converter (ADC) to create a discrete time signal before being passed to the channels of the receiver.

The apparatus 100 comprises a buffer 102 configured to receive the digitised IF signal. The buffer 102 is further configured to transfer buffered digital IF samples to a baseband processing unit 103. In some arrangements, the buffer may form part of the ADC. The baseband processing unit 103 comprises a mixer 104, a carrier numerically controlled oscillator (NCO) 106, a code generator 108, a code NCO 110 and a plurality of code correlators 112a-112c. Only three code correlators are shown in FIG. 1 although exemplary arrangements may include more, for example, there may be five, seven or nine code correlators.

The carrier NCO 106 is configured to generate a replica carrier signal and transfer them to the mixer 104. The carrier NCO 106 is driven by the carrier tracking loop. The mixer 104 is configured to multiply the replica carrier signal with the buffered digitised IF signal to produce a carrier removed signal, which comprises a code signal derived from at least one received satellite signal.

The code generator 108 (a pseudorandom noise PRN code generator, but termed a "code generator" herein) is driven by a code NCO 110, which in turn is driven by the code tracking loop. The code generator 108 is configured to generate a plurality of replica codes for the satellite signal currently being tracked based on a code-phase delay estimated by the code tracking loop. The plurality of replica codes comprises at least one late replica code, a prompt replica code and at least one early replica code. These terms will be understood by the skilled person.

The code generator 108 is configured to transfer the replica codes to a plurality of first correlators 112a-c, which are configured also to receive the carrier removed signal from the mixer 104. FIG. 1 shows one each of a late code correlator 112a, a prompt code correlator 112b and an early code correlator 112c. However, as mentioned above, exemplary methods disclosed herein may comprise a plurality of late code correlators and/or a plurality of early code correlators. In one specific example there may be four early code correlators, a prompt code correlator and four late code correlators.

The plurality of first correlators 112a-112c are configured to correlate the carrier removed signal with the plurality of replica codes to produce a plurality of code correlation samples. The apparatus 100 also comprises a plurality of integrate-and-dump units 113a-113c configured to receive the correlation samples and integrate them over time to average out the noise to output code correlation sums. This is well known in the art. The plurality of code correlation sums comprises at least one late code correlation sum, a prompt code correlation sum and at least one early code correlation sum. In addition, for clarity further features that may be necessary to put a practical GNSS into effect are not shown in the FIG. 1. Again, these are well known in the art.

Optionally, the apparatus 100 may comprise a plurality of multipliers 114a-114c and a data bit provider 116. The multipliers 114a-114c are configured to receive the code correlation sums from the plurality of integrate-and-dump units 113a-113c and also to receive modulation data from the data bit provider 116. The data bit provider 116 is configured to provide a copy of modulation data, e.g. a navigation message that has been used by the satellites to modulate the satellite signals before they are transmitted by the satellites. In exemplary arrangements, the data bit provider 116 may receive a copy of modulation data and transfer that to the multipliers 114a-114c in a number of ways that will be known to the skilled person. The multipliers 114a-114c are configured to multiply the plurality of code correlation sums output from the integrate-and-dump units 113a-113c with the modulation data received from the data bit provider 116 for removing the modulation data from the plurality of code correlation sums before further integration thereof. The further integration may be undertaken in a second correlator 118 (to be discussed next) or in a separate integrate and dump unit and produces further code correlation sums.

Removal of the modulation data and subsequent integration of the code correlation sums is termed long coherent integration and allows integration of the code correlation sums over timeframes up to hundreds of milliseconds. This is in contrast to much smaller (maximum 20 millisecond) integration times typically used in some GNSS receivers. A purpose of the long coherent integration in methods and apparatus disclosed herein is to provide a high degree of resolution, meaning a quick spectral decay of spectral lines in the frequency domain, which helps to distinguish small Doppler differences between LOS and multipath satellite signals in subsequent processing described herein.

In exemplary arrangements, the modulation data, which may be a copy of the navigation message, is provided by decoding the satellite signal in the GNSS receiver. The multipliers 114a-114c use that copy of the navigation message to remove bit flips in the code correlation sums before further integration. This may be done, for example, by multiplying the code correlation sums by the modulation data to cancel out the modulation bits. This prevents the destructive superposition in an integration spanning multiple bits of the navigation messages and allows longer integration times. This in turn increases the frequency resolution of second correlations between the further code correlation sums and a plurality of carrier signals each having a different Doppler offset, which may be provided by a discrete Fourier transform (DFT) engine, or a plurality of DFT units.

The data bit provider 116 may use the signal time-of-week to determine which modulation data is applicable for the plurality of code correlation sums. If no modulation data is applicable, a coherent integration length of 20 milliseconds instead of hundreds of milliseconds may be configured in the second correlator 118, which may be a DFT engine or a plurality of DFT units as previously mentioned.

The second correlator 118, is configured to receive the plurality of further code correlation sums with the modulation data removed. In the example of FIG. 1, the second correlator 118 is a DFT engine and is configured to undertake a DFT on each of the plurality of further code correlation sums to determine, for each of the further code correlation sums, a set of correlation magnitudes. The DFT engine is configured to undertake a DFT within a range of frequencies spanning the expected Doppler shifts for the satellite signals received by the GNSS receiver.

A DFT can be considered as a plurality of correlations spanning a frequency range. That is, a DFT of a given signal represents a correlation of that signal with a plurality of complex exponentials to produce a plurality of correlation magnitudes at different frequencies (frequency bins) within a range of frequencies. The output of a DFT comprises a plurality of frequency values and magnitudes (representing a correlation magnitude), which may be plotted to give a frequency spectrum for the signal. Therefore, each DFT output from the DFT engine 118 comprises a plurality of pairs of magnitudes and frequencies.

For completeness, it is noted that in other exemplary arrangements, long coherent integration might not be used and the second correlation may be undertaken on the code correlation sums output from the integrate-and-dump units 113a-113c.

The apparatus 100 further comprises an LOS identification module 120 that, based on the correlation magnitudes, identifies the LOS signal from the plurality of satellite signals.

The code phase and the Doppler of the identified LOS signal may be used to drive a code discriminator and feedback control unit 122 and a carrier discriminator and feedback control unit 124 respectively. The code discriminator and feedback control unit 122 and the carrier discriminator and feedback control unit 124 drive the code NCO 110 and the carrier NCO 106, respectively and provide data to a navigation engine 126, which may be a Kalman filter, for generation of the navigation solution. The skilled person will recognise other implementations are possible for the navigation engine 126 such as a least-squares filter. The navigation engine 126 may receive further inputs from an inertial measurement unit (IMU) 128 and/or one or more other channels 130, as would be understood by the skilled person.

The navigation engine 126 is configured to transfer the navigation solution to a central parameter generator (CPG) 132 that is configured to determine an a-priori LOS signal carrier frequency and an a-priori code phase for a next iteration of the LOS identification. The CPG 132 is therefore configured to transfer the a-priori LOS signal carrier frequency and code phase to the LOS identification unit 120.

Figure 2:
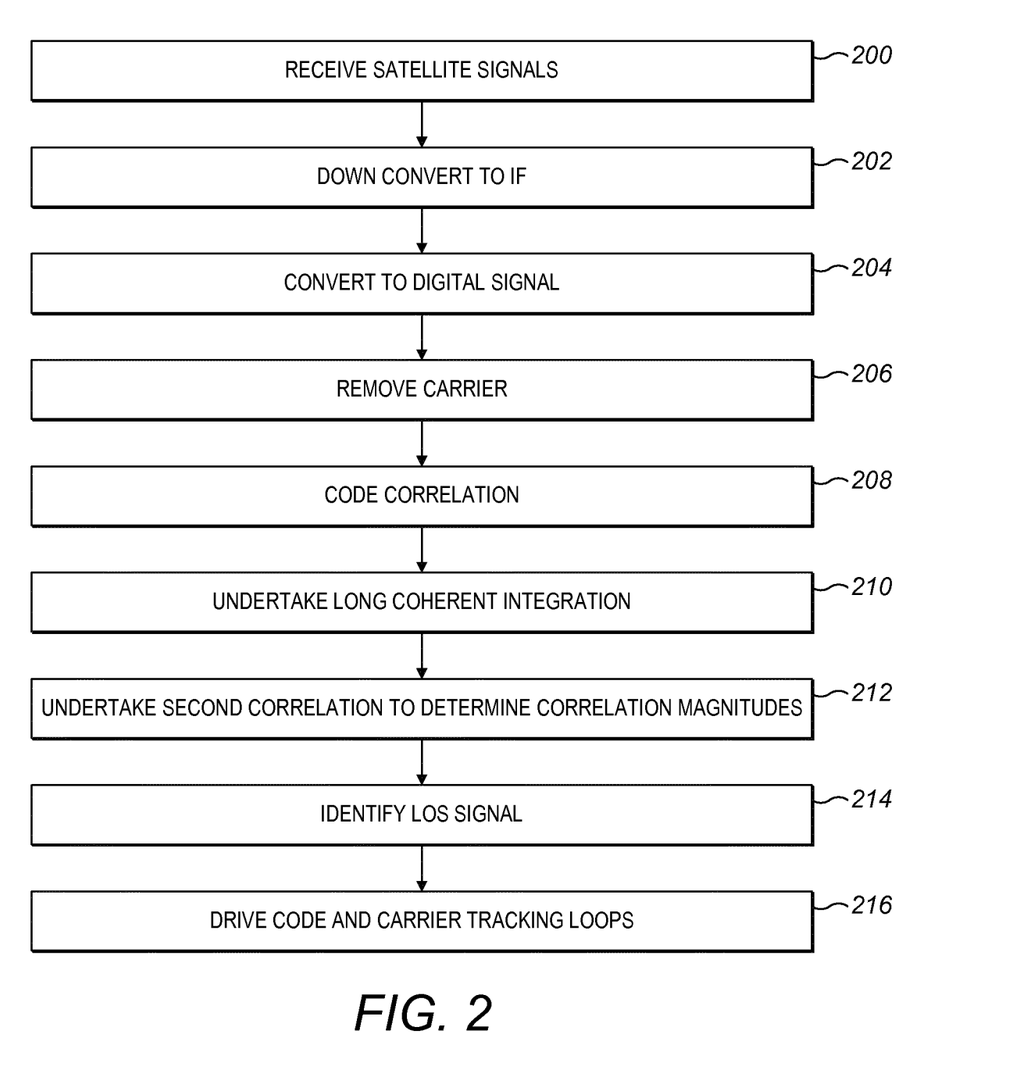
FIG. 2 is a flow diagram of a method for tracking a satellite signal.

FIG. 2 shows a flow diagram of a method for tracking a satellite signal received by a GNSS receiver and for determining an LOS satellite signal amongst a plurality of indirect (or multipath) signals from the satellite.

A plurality of satellite signals are received 200 by a GNSS receiver comprising the apparatus 100. The plurality of satellite signals are, for the purposes of this description, considered to arrive from a single satellite and comprise an LOS signal and one or more indirect (or multipath) signals, although in practical implementations of a GNSS receiver there may be a plurality of channels, each receiving and processing a plurality of satellite signals originating from different satellites.

As discussed above, the received satellite signals are down-converted 202 to IF and then A/D converted 204 to form a discrete-time signal.

After buffering, the down-converted received satellite signals have the carrier signal removed therefrom. To do this, the carrier NCO 106 generates a replica carrier signal based on a previous output from the carrier discriminator and feedback control unit 124 and transfers it to the mixer 104, which also receives the buffered, down-converted received satellite signals. The mixer 104 multiplies the replica carrier signal by the down-converted received signal, resulting in a carrier removed signal.

The carrier removed signal is transferred to the plurality of code correlators 112a-112c, which also receive the plurality of replica code signals generated by the code generator 108, which is driven by the code NCO 110 based on a previous output from the code discriminator and feedback control unit 122. The code generator 108 may have a tapped delay line structure with a total of L taps, where L is typically an odd number and the prompt tap is located in the middle of the L taps. On either side of the prompt tap there are one or more early taps and one or more late taps, the number of which can be expressed as (L−1)/2 of each in this example. The code generator 108 can be configured to control the spacing between taps. In implementations comprising a hardware baseband processing unit 103 and hardware correlators, the minimum tap spacing is constrained by the hardware design.

The code correlators 112a-112c correlate 208 the carrier removed signal with each of the replica PRN codes generated by the code generator 108. This process may be referred to as de-spreading. FIG. 1 is simplified, as is common in telecommunications schematics, in that only a single transmission path through the apparatus is shown. However, it will be understood that the apparatus includes both in-phase (I) and quadrature (Q) transmission paths. Accordingly, each code correlator 112a-112c generates code correlation samples that comprise I and Q sample streams with a typical sample frequency higher or equal to the PRN code repetition frequency.

The code correlation samples are integrated over time in the integrate-and-dump units 113a-113c to produce code correlation sums.

As discussed above, exemplary methods and apparatus may undertake long coherent integration 210 to remove the modulation data from the code correlation sums. In one exemplary arrangement, the multipliers 114a-114c receive the code correlation samples from the code correlators 112a-112c and modulation data from the data bit provider 116 and multiply the two together to remove the modulation data. Alternatively, the multipliers 11a-114c receive the code correlation sums from the integrate-and-dump units 113a-113c and modulation data from the data bit provider 116 and multiply the two together to remove the modulation data. In both cases this removes bit flips and provides the opportunity for longer integration times for integration of the code correlation samples or code correlation sums, which in turn improves noise performance (i.e. signal-to-noise ratio (SNR)) by averaging the noise.

The plurality of code correlation sums with modulation data removed are transferred to the second correlator 118 where they are integrated over a longer time period as disclosed above to produce further code correlation sums, although this could be done in a separate unit. In the example given herein the second correlator 118 comprises a DFT engine, although other types of correlators may be used. For example, the frequency and magnitude pairs of values may be produced using a Wavelet transform. A second correlation is undertaken 212 on the further code correlation sums, which provides correlation in the frequency domain. As discussed above, the DFT engine produces a plurality of pairs of frequencies and correlation magnitudes for each of the further code correlation sums. That is, the DFT engine outputs a plurality of correlation magnitudes that each correspond to a correlation between the further code correlation sums and a particular Doppler frequency. The frequency range of the DFT produced by the DFT engine is configured to encompass an expected Doppler of the LOS signal.

In an exemplary arrangement, instead of a DFT engine, a bank of individual DFT units may be used.

Typically, a long coherent integration time, $T_C$, is chosen and in exemplary arrangements may be a multiple of 100 ms depending on the dynamics of the satellite signals that are being tracked. As a result of $T_C$, a frequency bin spacing within the DFT engine, which is a frequency resolution of the spectrum of correlation magnitudes can be determined by $$f_{res} = \frac{1}{T_c}$$

A maximum frequency span of the DFT engine, i.e +/−$f_{max}$, may be determined by the DFT engine capability or hardware design. In practice, a maximum frequency span in which $f_{max}$ is 150 Hz (i.e. +/−$f_{max}$ is 300 Hz) is usually sufficient to cover the Doppler spread of the satellite signal dynamics in a mobile multipath environment, and the total number of frequency bins is then given by $$N_{bin} = 2\left(\frac{f_{max}}{f_{res}}\right) + 1$$

The correlation magnitudes are transferred to the LOS identification unit 120, which identifies 214 the LOS satellite signal amongst the one or more multipath signals. The correlation magnitudes determined by the DFT engine having $N_{bin}$ frequency bins may be formed into an L×$N_{bin}$ matrix, where L is the number of taps from the code generator 108 (discussed above) and therefore the number of further code correlation sums, and $N_{bin}$ is the number of frequency bins of the DFT engine. Each "spectrum" of correlation magnitudes, which in this case is the DFT of one of the further code correlation sums, forms a row of the matrix and corresponds to a particular code phase delay (tap). Therefore, sequentially progressing through all taps fills the matrix row by row. The matrix is considered to be a correlation area. The process of generating the matrix is termed frequency-time-domain correlation.

Within the correlation area, local maxima may be identified, which may be a maximum of a correlation function. A column of the aforementioned matrix may provide a correlation function if the set of correlation magnitudes rise above a noise floor. In exemplary arrangements, a local maximum may be considered to be a correlation magnitude that has the highest magnitude in a column of the matrix (e.g. within a correlation function) and/or that has a magnitude greater than a noise level by at least a threshold. In some specific examples, a local maximum may be defined to have a signal-to-noise ratio of 6 dB.

Figure 3:
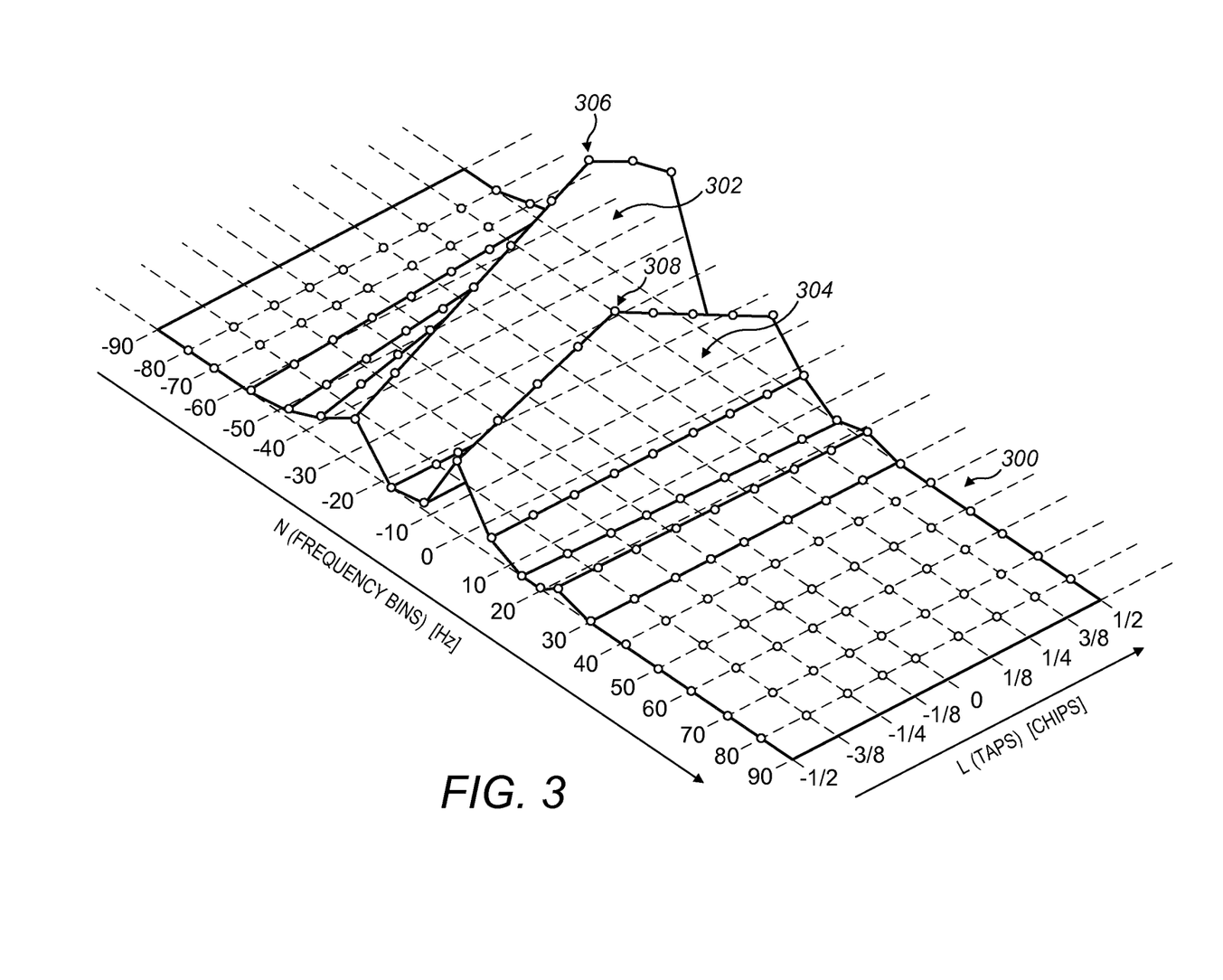
FIG. 3 shows a representation of an example frequency-time-domain correlation area.

FIG. 3 shows an exemplary correlation area (or space) 300 with the correlation magnitudes represented graphically as a surface. The units of FIG. 3 are Hz for the x-axis (−90 Hz to 90 Hz) and chips for the y-axis (−½ chip to ½ chip). The exemplary correlation magnitudes in FIG. 3 reveal two correlation functions 302, 304 which correspond to two signal propagation paths for the same satellite signal transmitted by the GNSS satellite (i.e. an LOS signal and a multipath signal). Each of the two correlation functions 302, 304 comprise correlation magnitudes (nine in the example of FIG. 3) in a single column of the matrix relating to a particular Doppler frequency. The correlation magnitudes have different signal propagation delays associated with them based on the tap from which the code correlation sums were generated. Each of the correlation functions 302, 304 includes a local maximum 306, 308, which may be as defined above. In the example of FIG. 3, the satellite signal associated with the local maximum 306 arrives later at the GNSS receiver than the satellite signal associated with the local maximum 308.

Figure 4:
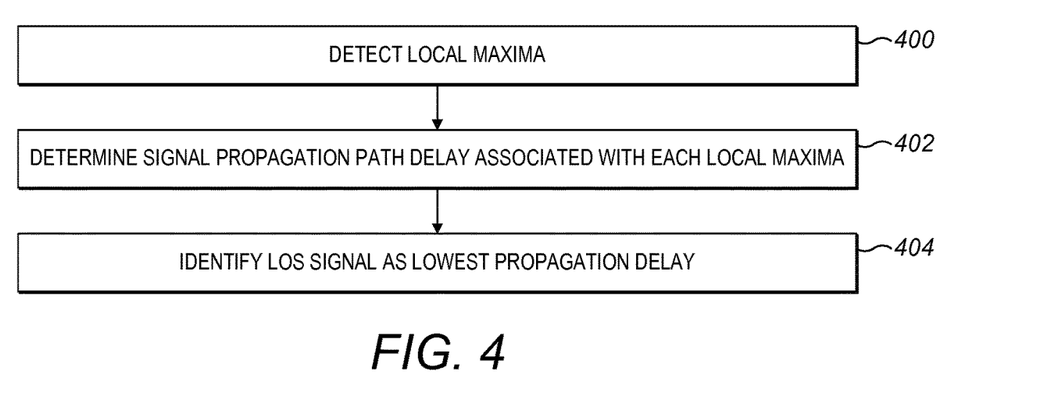
FIG. 4 is a flow diagram of a method for identifying an LOS signal based on the frequency-time-domain correlation area.

FIG. 4 shows an exemplary method for identifying the LOS satellite signal. The LOS identification unit 120 detects the local maxima in the correlation area and, based thereon, identifies the LOS satellite signal. Each identified local maximum is associated with a Doppler frequency (i.e. a frequency bin) and a signal propagation path delay (i.e. a tap). In the example of FIG. 3, a corresponding method for which is shown in FIG. 4, the local maxima are detected 400, the signal propagation path delays are determined 402 for each of the local maxima detected and the local maximum associated with the smallest signal propagation path delay is identified as corresponding to the LOS satellite signal. This may be done independently of the local maxima amplitudes and implies that even a weak LOS satellite signal can be detected in the presence of stronger multipath satellite signals. In the example of FIG. 3, the signal path including the smaller magnitude local maximum is identified as the satellite signal corresponding to the LOS propagation path. The higher magnitude local maximum in this example actually belongs to a signal affected by multipath interference.

Figure 5:
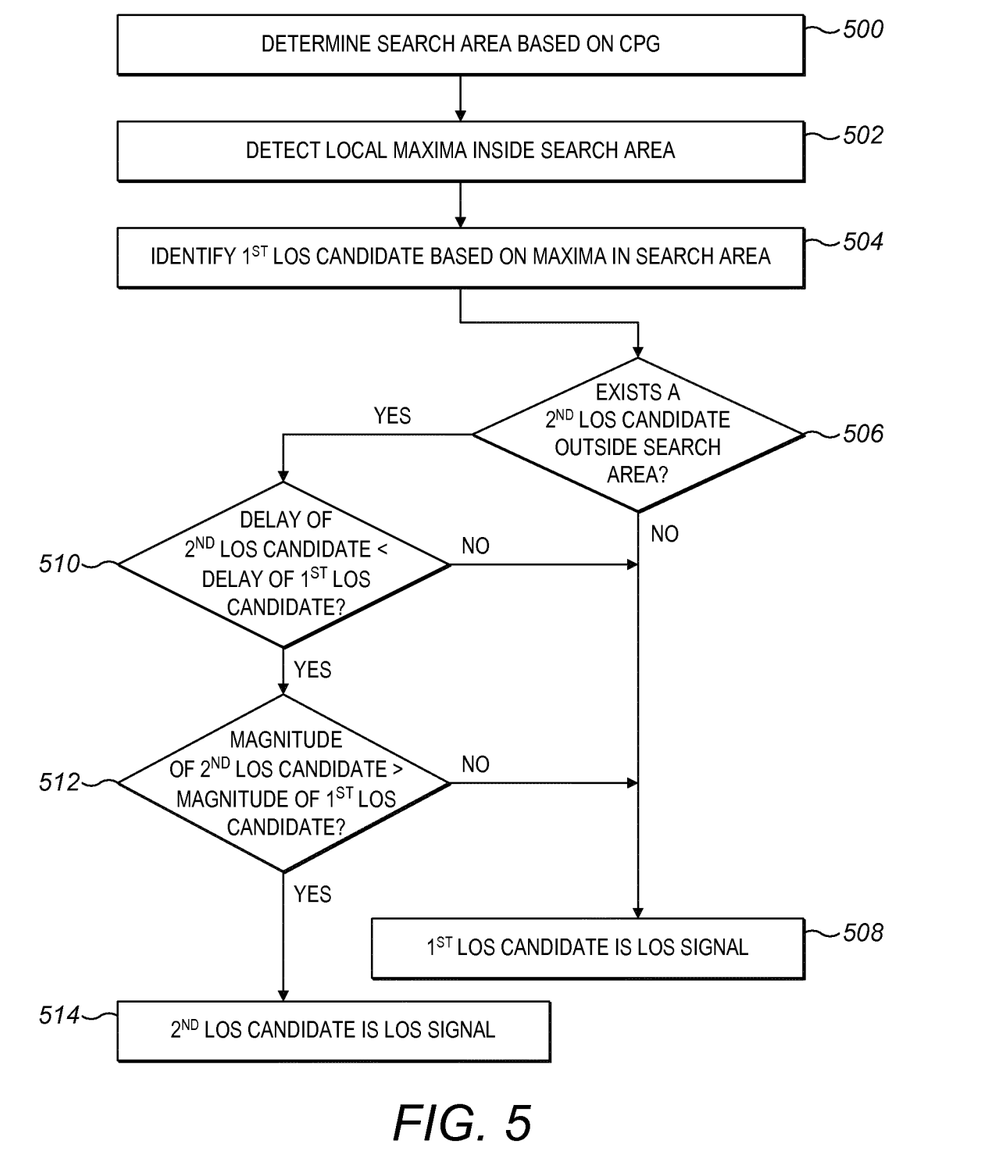
FIG. 5 is a flow diagram of a method for identifying an LOS signal based on the frequency-time-domain correlation area.

FIG. 5 shows a further exemplary method for identifying the LOS satellite signal, in which data from the navigation engine may be used to determine a frequency-time-domain search area within the correlation area. In other words, information from the navigation engine may be used to confine a search space to an area smaller than the correlation area 300. The search area may be determined 500 using outputs from the CPG 132. For example, the CPG 132 may determine an a-priori LOS carrier frequency and an a-priori LOS code phase along with an estimation of the variance of each and this may be used to determine the search area.

In one example, the a-priori carrier frequency can be used to determine an expected Doppler frequency within the correlation area. Similarly, the a-priori code phase can be used to determine an expected signal propagation path delay within the correlation area. These two parameters identify a correlation magnitude within the correlation area. Once the position of the correlation magnitude is determined, the variance of the a-priori LOS carrier frequency and a-priori LOS code phase can be used to determine the extent of the search area in terms of Doppler frequency and signal propagation path delay.

The search area (or search space) is a subarea of the correlation area. In such exemplary arrangements, the LOS signal may be identified based on the local maxima within the search area.

For example, in FIG. 5, the local maxima within the search area are detected 502 and the satellite signal corresponding to the local maximum having the smallest signal propagation path delay is determined 504 to be a first candidate LOS signal. The LOS identification unit 120 may then detect 506 whether there are any local maxima outside the search area and, if so, the satellite signal corresponding to the local maximum outside the search area having the smallest signal propagation path delay is identified as a second candidate signal.

If there are no local maxima outside the search area, the first candidate LOS signal is identified 508 as the LOS satellite signal.

If there is a second candidate LOS signal, the LOS identification unit 120 determines 510 whether the second candidate LOS signal has a signal propagation path delay smaller than the first candidate LOS signal and also determines 512 whether the second candidate LOS signal has a magnitude greater than the first candidate LOS signal. In some embodiments the LOS identification unit 120 determines 512 whether the second candidate LOS signal has a magnitude greater than the first candidate LOS signal by at least a threshold. The skilled person will recognise a zero-valued threshold is also possible. If the answer to one or both of those is "no", then the first candidate LOS signal is identified 508 as the LOS satellite signal. If the answer to both questions is "yes" then the second candidate LOS signal is identified 514 as the LOS satellite signal.

Returning to FIG. 2, the code phase associated with the determined LOS satellite signal is transferred to the code discriminator and feedback control unit 122 and the Doppler is transferred to the carrier discriminator and feedback control unit 124. This data is therefore used to drive 216 the code discriminator and feedback control unit 122 and the carrier discriminator and feedback control unit 124. The code- and carrier discriminator and feedback control unit 122 and 124, respectively, in turn drive the code NCO 110 and carrier NCO 106 for the next iteration of the process described herein. Either model-less schemes such as PID controller or model-based schemes such as Kalman filters can be used here. Regarding the code phase discriminator in the code phase discriminator and feedback control unit 122, any kind of multi-tap discriminator can be used to further suppress multipath signals falling into the same frequency bin. Such mitigation approaches to static multipath are well known in the art.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. An apparatus for processing satellite signals of a Global Navigation Satellite System (GNSS), the satellite signals including a line-of-sight (LOS) signal and a plurality of indirect signals, the apparatus comprising:
a first correlator configured to correlate a code signal, derived from one of the satellite signals, with a plurality of replica code signals to determine a plurality of code correlation sums, the code correlation sums comprising:
a prompt code correlation sum;
a plurality of early code correlation sums; and
a plurality of late code correlation sums,
wherein the replica code signals are indicative of different satellite signal propagation delays;
a second correlator configured to correlate the code correlation sums with a plurality of replica carrier signals to determine a plurality of correlation magnitudes at frequencies of the replica carrier signals, the replica carrier signals comprising a plurality of Doppler frequency offsets; and
a LOS identification module configured to identify the LOS signal based on signal propagation delays corresponding to local maxima within the correlation magnitudes.

2. The apparatus according to claim 1, wherein the LOS identification module is configured to identify one of the local maxima as a largest one of the correlation magnitudes, the largest one of the correlation magnitudes relating to one of the replica code signals and having a signal-to-noise ratio greater than a threshold value.

3. The apparatus according to claim 1, wherein the LOS identification module is configured to identify one of the satellite signals as the LOS signal, the one of the satellite signals corresponding to one of the local maxima associated with a lowest signal propagation delay.

4. The apparatus according to claim 1, wherein the correlation magnitudes define a frequency-time-domain correlation area and the apparatus further comprises:
a Central Parameter Generator, configured to determine a LOS carrier frequency, a variance of the LOS carrier frequency, a LOS code phase, and a variance of the LOS code phase based on position, velocity, or time data previously determined by the apparatus,
wherein the LOS identification module is configured to:
determine a frequency-time-domain search area based on the variance of the LOS carrier frequency and the variance of the LOS code phase, the frequency-time-domain search area being a subarea of the frequency-time-domain correlation area; and
identify the LOS signal based on the correlation magnitudes in the frequency-time-domain search area.

5. The apparatus according to claim 4, wherein:
a first one of the local maxima is inside the frequency-time-domain search area and a second one of the local maxima is outside the frequency-time-domain search area; and
the LOS identification module is configured to identify one of the satellite signals corresponding to the second local maximum as the LOS signal if the second local maximum comprises a signal propagation delay lower than the first local maximum and has a magnitude greater than the first local maximum by at least a threshold value.

6. The apparatus according to claim 1, wherein:
the code correlation sums comprise modulation data; and
the apparatus further comprises a multiplier configured to remove the modulation data from the code correlation sums.

7. The apparatus according to claim 1, wherein the second correlator comprises a discrete Fourier transform (DFT) engine configured to determine the correlation magnitudes by performing DFT of the code correlation sums.

8. The apparatus according to claim 1, wherein the first correlator, the second correlator, and the LOS identification module are configured as components of a GNSS receiver.

9. A method for processing satellite signals of a Global Navigation Satellite System (GNSS), the satellite signals including a line-of-sight (LOS) signal and a plurality of indirect signals, the method comprising:
correlating a code signal, derived from one of the satellite signals, with a plurality of replica code signals to determine a plurality of code correlation sums, the code correlation sums comprising:
a prompt code correlation sum;
a plurality of early code correlation sums; and
a plurality of late code correlation sums,
wherein the replica code signals are indicative of different satellite signal propagation delays;
correlating the code correlation sums with a plurality of replica carrier signals to determine a plurality of correlation magnitudes at frequencies of the replica carrier signals, the replica carrier signals comprising a plurality of Doppler frequency offsets; and
identifying the LOS signal based on signal propagation delays corresponding to local maxima within the correlation magnitudes.

10. The method according to claim 9, further comprising:
identifying one of the local maxima as a largest one of the correlation magnitudes, the largest one of the correlation magnitudes relating to one of the replica code signals and having a signal-to-noise ratio greater than a threshold value.

11. The method according to claim 9, wherein identifying the LOS signal comprises identifying one of the satellite signals as the LOS signal, the one of the satellite signals corresponding to one of the local maxima associated with a lowest signal propagation delay.

12. The method according to claim 9, wherein the correlation magnitudes define a frequency-time-domain correlation area, the method further comprising:
determining a LOS carrier frequency, a variance of the LOS carrier frequency, a LOS code phase, and a variance of the LOS code phase based on previously determined position, velocity, or time data;
determining a frequency-time-domain search area based on the variance of the LOS carrier frequency and the variance of the LOS code phase, the frequency-time-domain search area being a subarea of the frequency-time-domain correlation area; and
identifying the LOS signal based on the correlation magnitudes in the frequency-time-domain search area.

13. The method according to claim 12, wherein:
a first one of the local maxima is inside the frequency-time-domain search area and a second one of the local maxima is outside the frequency-time-domain search area; and
identifying the LOS signal comprises identifying one of the satellite signals corresponding to the second local maximum as the LOS signal if the second local maximum has a signal propagation delay lower than the first local maximum and has a magnitude greater than the first local maximum by at least a threshold value.

14. The method according to claim 9, wherein:
the code correlation sums comprise modulation data; and
the method further comprises removing the modulation data from the code correlation sums.

15. The method according to claim 9, further comprising:
determining the correlation magnitudes by discrete Fourier transform of the code correlation sums.

16. A non-transitory computer-readable medium storing instructions which, when executed, cause at least one processor to perform operations for processing satellite signals of a Global Navigation Satellite System (GNSS), the satellite signals including a line-of-sight (LOS) signal and a plurality of indirect signals, the operations comprising:
correlating a code signal, derived from one of the satellite signals, with a plurality of replica code signals to determine a plurality of code correlation sums, the code correlation sums comprising:
a prompt code correlation sum;
a plurality of early code correlation sums; and
a plurality of late code correlation sums;
wherein the replica code signals are indicative of different satellite signal propagation delays;
correlating the code correlation sums with a plurality of replica carrier signals to determine a plurality of correlation magnitudes at frequencies of the replica carrier signals, the replica carrier signals comprising a plurality of Doppler frequency offsets; and
identifying the LOS signal based on signal propagation delays corresponding to local maxima within the correlation magnitudes.

17. The non-transitory machine-readable medium according to claim 16, the operations further comprising:
identifying one of the local maxima as a largest one of the correlation magnitudes, the largest one of the correlation magnitudes relating to one of the replica code signals and having a signal-to-noise ratio greater than a threshold value.

18. The non-transitory machine-readable medium according to claim 16, wherein identifying the LOS signal comprises identifying one of the satellite signals as the LOS signal, the one of the satellite signals corresponding to one of the local maxima associated with a lowest signal propagation delay.

19. The non-transitory machine-readable medium according to claim 16, wherein the correlation magnitudes define a frequency-time-domain correlation area and the operations further comprise:
  determining a LOS carrier frequency, a variance of the LOS carrier frequency, a LOS code phase, and a variance of the LOS code phase based on previously determined position, velocity, or time data;
  determining a frequency-time-domain search area based on the variance of the LOS carrier frequency and the variance of the LOS code phase, the frequency-time-domain search area being a subarea of the frequency-time-domain correlation area; and
  identifying the LOS signal based on the correlation magnitudes in the frequency-time-domain search area.

20. The non-transitory machine-readable medium according to claim 16, wherein:
  a first one of the local maxima is inside the frequency-time-domain search area and a second one of the local maxima is outside the frequency-time-domain search area; and
  identifying the LOS signal comprises identifying one of the satellite signals corresponding to the second local maximum as the LOS signal if the second local maximum has a signal propagation delay lower than the first local maximum and has a magnitude greater than the first local maximum by at least a threshold value.

* * * * *